United States Patent [19]

Thomin

[11] 3,891,953
[45] June 24, 1975

[54] HIGH HOLDING STRENGTH AND LOW RESPONSE TIME ELECTRO-MAGNET STRUCTURE

[75] Inventor: Georges Thomin, Ramonville, France

[73] Assignee: Centre National d'Etudes Spatiales, Paris, France

[22] Filed: Apr. 2, 1974

[21] Appl. No.: 457,212

[30] Foreign Application Priority Data
Apr. 3, 1973 France .............................. 73.11920
Jan. 4, 1974 France .............................. 74.00306

[52] U.S. Cl. ................. 335/289; 335/286; 335/288
[51] Int. Cl. ............................................... H01f 7/20
[58] Field of Search .......... 335/288, 289, 291, 284, 335/285, 286, 209

[56] References Cited
UNITED STATES PATENTS
| | | | |
|---|---|---|---|
| 1,603,497 | 10/1926 | Simmons | 335/288 |
| 1,604,323 | 10/1926 | Spencer | 335/288 |
| 2,275,839 | 3/1942 | Boehne | 335/288 |

*Primary Examiner*—Harold Broome
*Attorney, Agent, or Firm*—Wigman & Cohen

[57] ABSTRACT

A high holding power and low response time electro-magnet, supported by a shaft, the axis of which materializes the direction of the attraction to be exerted by the electro-magnet on a system which is co-axial to the same axis, and which may be a revolving system, is designed so that its fixed part or core and its mobile part or armature are both co-axially conformed to the shaft axis core support and made from concentric magnetic steel plates of high saturation induction material, applied against each other.

9 Claims, 3 Drawing Figures

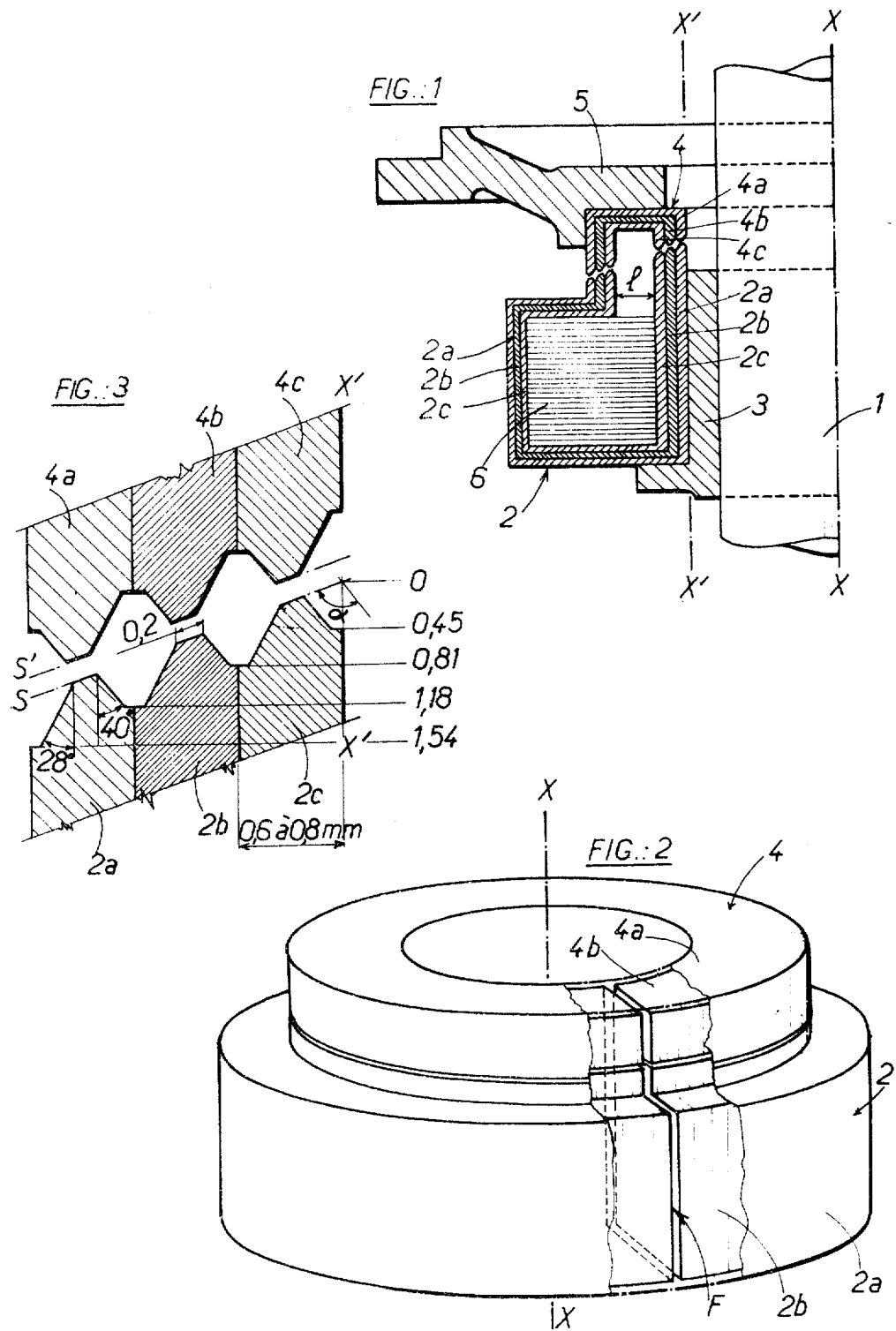

HIGH HOLDING STRENGTH AND LOW RESPONSE TIME ELECTRO-MAGNET STRUCTURE

The present invention relates to an electro-magnet and more specifically to a high holding power and low response time electro-magnet, supported by a shaft, the axis of which materializes the direction of the attraction to be exerted by the electro-magnet on a system which is co-axial to the same axis, and which may be a revolving system. To clarify the ideas we may already indicate that we aim at obtaining a holding strength of at least 25 Kg and a response time at the most of 2 ms. Both required values, high holding strength and low response time, which are nevertheless necessary in a specific application relating to satallite equipment, and which are still suitable for many applications, are more or less contradictory, so that still the present time it was not possible to obtain them in combination in a same electro-magnet. Moreover, the electro-magnet must have a re-centering action when the armature is subjected to a radial motion.

The result sought for can nevertheless be reached if, in accordance with the invention, the electromagnet fixed part or core and its mobile part or armature are both co-axially conformed to the shaft axis core support and made from concentric magnetic steel plates of high saturation induction material, applied against each other.

In the accompanying drawings:

FIG. 1 shows, in axial section, half a section of the electro-magnet according to the invention.

FIG. 2, in large scale, the teeth section in the vicinity of the airgap.

FIG. 3, in perspective, arrangement of a slot F according to a preferred realization mode, for instance according to a unique radial plane going through the X—X axis.

The electro-magnet core 2 to be realized is fitted on a shaft 1 (FIG. 1). It is designed for the considered specific application, that the electro-magnet must exert an attraction force in a well defined direction and also with a comparatively high holding strength while having a short response time.

The attraction force direction must be such that for any radial motion of the armature 4 there is a re-centering force component of this armature around shaft 1 X—X axis.

In the field of low currents, one would immediately think, for such a realization, of using a divided mild steel or ferrite core. But the flux which has to be created in the present case, to obtain holding strengths of the considered order of magnitude (25 Kg), is too intense to be able to use this material.

Thus, according to the invention, we use a more conventional material, with high saturation induction, laminate plates, they will be Fe Co laminates. Lamination, for a large part, prevents Foucault's currents circulation which would reduce the bandwidth of the system within which the electro-magnet is inserted, that is to say would increase its response time. This bandwidth is defined by the frequency response of the attraction force considered as being the system output value, to the current in the electro-magnet coil considered as input value. At the same time, according to the invention, the laminates insulated one from the other, glued or applied one on top of the other, co-axially and concentrically surround shaft 1, to constitute the core 2 as well as the armature 4. Insulation between laminates is realized, for instance, by superficial oxidization, without this being limitative.

On FIG. 1 we see how, in practice, the electro-magnet can be realized. The core 2 (or 2*a*, 2*b*, 2*c*, FIG. 2) is tightened around a sleeve 3 mounted on shaft 1. To the core 2 corresponds an armature 4 (or 4*a*, 4*b*, 4*c*) opposite and secured on part 5, concentric to the X—X axis which transmits the stress created by the electro-magnet, energized by a coil 6, also concentric to the axis.

The core as well as the armature are realized by applying on top of the other three laminates 2*a*, 2*b*, 2*c*, high induction in the present case. Nevertheless, this number must not be considered as limitative, but with the laminates used for the realization example, with a thickness of 0.6 to 0.8 mm, we manage to obtain, with a suitable circuit, a 2 ms response time.

It should be further noted that the core section, which one can imagine generating the core volume by revolving around the X—X axis, here is more or less U shaped to form a plurality of circular gutters disposed in nesting relation to each other and it is the same for the armature. This permits to the energizing coil 6 to be housed inside the core 4 without loss of flux. A rather important current goes through the latter (about 500 A) and nevertheless the distance between 1 and the U-branches (practically 0.3 cm) is insufficient to house a sufficient number of turns for the coil, this is why, to the U-branch being farthest outside, we gave a protruding shape. Furthermore, thanks to the U-shape, we may say that the core and the armature section includes 6 laminates. These laminates are individually and accurately machined from the block, then fitted one into the other, which ensures the tightness and the hold, on sleeve 3 for the core and on part 5 for the armature.

The radial airgap width is about 0.2 mm and the useful armature stroke is limited by stops (not represented) to 0.15 mm. Advantageously, we give the airgap a conical or semi conical shape, the opposite air gap faces S, S' being on the whole parallel. The imaginary summits of the two airgap cones represented by the surfaces S, S' are located on the same side as the armature in relation to the core. The purpose of this arrangement is to obtain a self centering of the armature on the X—X axis, that is to say the attraction force can be accurately directed.

In this respect, we found that the angle at the cones summits had to be practically between 150° and 170°. The truncated shaped teeth have sides making respectively 28° and 40° with the general direction X'-X parallel to the X—X axis.

On FIG. 3 we indicated these various values as well as the useful dimensions in microns, as a non-limitative example and to define the ideas.

One advantage of the invention device consists in that it permits an eventually fast revolution (about 10,000 r.p.m) of the system, without braking torque which could result from Foucault's currents in the electromagnet magnetic circuit, owing to the fact that the circuit is divided into concentric cylinders with equal flux distribution around the shaft, the device however retaining its self centering properties.

Association of teeth with a conical airgap, at least noticeably, permits obtaining armature centering properties and also to cause them to vary as a function of the teeth and the airgap actual shape. It is also possible to consider spherical airgaps or any other suitable revolution shape without for this leaving the present invention framework.

Should the system to be centered have a fixed location point on the axis, the configuration of this invention will permit a re-centering by transverse pivoting around this point, it is then suitable to adopt a spherical shape having its center on this point, for the airgap.

It is still possible to improve the above structure as it is going to be explained. It is obvious that the laminate division of the core and the armature into several plates very noticeably reduces the Foucault's current circulation according to the radial direction.

It is actually important, for the purpose of the invention, viz, obtaining a short response time from the electro-magnet with nevertheless a high holding strength, to reduce to a minimum these Foucault's currents as they delay flux establishment in the plates and thereby that of the flux in the airgaps, hence the attraction force introduction. This delay cumulates itself with the "skin effect" unavoidable of the surface of each plate.

According to the above stated realization shape, which is a revolution around shaft 1 X—X axis, actually the plates constitute circular turns in short circuits of X—X axis.

It is clear that in alternating or transient regime these turns or at least those located inside in relation to the others "see" flux variations and this is true for the "core" part as well as for the "armature" part of the electro-magnet.

Thus the turn constituted by the plate 2c "sees" the flux variations in plates 2a and 2b;

the turn constituted by plate 2b, the flux variations in plate 2a, the turn constituted by plate 4c, the flux variations in plates 4a and 4b, and the turn constituted by plate 4b, the flux variations in plate 4a.

From these flux variations arise, in each turn, an electromotive force and a short circuit leakage current which have nefarious effects of the Focault's currents above mentioned.

According to an evolved realization mode, we provide means to oppose currents circulation in the circular X—X axis turns, which have just been indicated.

To this effect, according to the invention, among the fitted plates of the core part and/or of the armature part of the electro-magnet, at least each one of the plates located within the most exterior plate in relation to the energizing coil presents at least one continuous slot connecting an airgap point, representing a free branch of a U, to another airgap point located on a free branch of the U opposed to the previous one.

For instance (see FIG. 2) it is possible the delay needlessly caused by the Foucault's currents in the said circular turns by reserving in the plates 4c, 4b and 2b, 2c, a slot F which prevents circulation of these currents and which is located for the core part as well as for the armature part, in a same radial plane going through X—X and on only one side.

Of course, we can consider several slots in each turn, but only one is sufficient to interrupt circulation of the above mentioned currents.

It is also possible to provide a slot in a first radial plane for the armature part and another in another radial plane for the core part.

It is also possible to be satisfied with only one such a slot in the core part, the result being obviously not as good.

It is also possible to shift the slots in distincts radial planes and angularly different going through the X—X axis for the different plates.

It is also possible to provide a slot in the most outside plate in relation to the winding, but, practically, we may consider that the fact that the most outside plate be not slotted, causes only a small delay, while conversely increasing the glued system rigidity.

In this way, in a structure established as previously stated, the only remaining delay will practically result from the plates skin effect, effect which will be all the smaller as each plate will be thinner.

Such a configuration according to this last realization mode has for result to increase the electro-magnet response time in a ratio of two to four times the initial value given by the first realization mode.

Of course, the described realization modes are only examples and it would be possible to change them, particularly by substituting technical equivalents without for this going out of the invention framework.

I claim:

1. An electro-magnet apparatus for attracting a load comprising:

a shaft;

an armature adapted to support a load and formed of a plurality of electrically insulated magnetic plates arranged concentrically of said shaft and fitted one into another, the armature plates being made of a high saturation induction material;

a core formed of a plurality of electrically insulated magnetic plates arranged concentrically of said shaft and fitted one into another, the core plates being made of a high saturation induction material, said core disposed in axially spaced relation to said armature; and an energizing coil means disposed in cooperating relation to said core for generating a magnetic flux therein, whereby when said coil means is excited by an electrical current a large attraction force having a short response time will be generated.

2. Electro-magnet apparatus according to claim 1 wherein each of said armature and core plates has a generally U-shaped cross-section such that said armature and core plates form circular gutters, the free ends of the U-shaped gutters formed by said armature plates substantially confronting the respective free ends of the U-shaped gutters formed by said core plates and wherein said coil means is concentrically disposed in the circular gutter formed by said core plates.

3. Electro-magnet apparatus according to claim 1 wherein at least a portion of the confronting ends of said armature plates form a first conical surface and at least a portion of the confronting ends of said core plates form a second conical surface, said first and second conical surfaces being in equispaced relationship to each other, the imaginary summits of said first and second conical surfaces being directed toward the armature in relation to the core, the angle formed by the summit being 150° to 170°.

4. Electro-magnet apparatus according to claim 3 wherein said first and second conical surfaces of said armature and core, respectively, are each formed with concentrically disposed truncated teeth, the inwardly facing side of each tooth of said core and the outwardly facing side of each tooth of said armature forming an angle of about 40° with the axis of said shaft, and the outwardly facing side of each tooth of said core and the inwardly facing side of each tooth of said armature forming an angle of about 28° with said shaft axis.

5. Electro-magnet apparatus according to claim 4 wherein the confronting end surfaces of said armature and core plates are shaped in the form of an individual one of said truncated teeth.

6. Electro-magnet apparatus according to claim 1 wherein at least one of said core and armature plates located interiorly of the outermost concentric plates of said core and armature plates is provided with a continuous radial slot disposed longitudinally thereof.

7. Electro-magnet apparatus according to claim 6 wherein only the interiorly disposed core and armature plates are provided with a radial slot.

8. Electro-magnet apparatus according to claim 6 wherein each of said core and armature plates located interiorly of the outermost concentric plates of said core and armature plates is provided with a radial slot, all the slots of at least one of the said core and armature being arranged in the same radial plane.

9. Electro-magnet apparatus according to claim 6 wherein each of said core and armature plates located interiorly of the outermost concentric plates of said core and armature plates is provided with a radial slot, each of the slots of at least one of the said core and armature being arranged in a different angularly-spaced radial plane.

* * * * *